US012132432B2

(12) United States Patent
Ling et al.

(10) Patent No.: US 12,132,432 B2
(45) Date of Patent: Oct. 29, 2024

(54) ENERGY CONVERSION DEVICE AND VEHICLE

(71) Applicant: BYD COMPANY LIMITED, Guangdong (CN)

(72) Inventors: Heping Ling, Shenzhen (CN); Lei Yan, Shenzhen (CN); Yong Xiong, Shenzhen (CN); Chen Hong, Shenzhen (CN); Junwei Zhang, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 188 days.

(21) Appl. No.: 18/074,233

(22) Filed: Dec. 2, 2022

(65) Prior Publication Data

US 2023/0097060 A1 Mar. 30, 2023

Related U.S. Application Data

(63) Continuation of application No. PCT/CN2021/094356, filed on May 18, 2021.

(30) Foreign Application Priority Data

Jun. 4, 2020 (CN) .......................... 202010502052.4

(51) Int. Cl.
*H02P 25/22* (2006.01)
*H02P 27/06* (2006.01)
*H02P 29/68* (2016.01)

(52) U.S. Cl.
CPC .............. *H02P 29/68* (2016.02); *H02P 27/06* (2013.01)

(58) Field of Classification Search
CPC .... H02P 29/68; H02P 27/06; H01M 2220/20; H01M 10/615; H01M 10/625; H01M 10/637; H01M 10/667
See application file for complete search history.

(56) References Cited

U.S. PATENT DOCUMENTS

| 2002/0070715 | A1  | 6/2002  | Sasaki et al. |
| 2012/0277058 | A1  | 11/2012 | Ishikawa |
| 2021/0075037 | A1* | 3/2021  | Breu .................... H01M 16/006 |
| 2021/0370799 | A1* | 12/2021 | Li ........................... B60L 58/26 |

FOREIGN PATENT DOCUMENTS

| CN | 102756728 A | 10/2012 |
| CN | 103434415 A | 12/2013 |
| CN | 204289653 U | 4/2015 |

(Continued)

OTHER PUBLICATIONS

International Search Report and Written Opinion for Application No. PCT/CN2021/094356, mailed on Aug. 5, 2021, 13 pages.

*Primary Examiner* — Muhammad S Islam

(57) ABSTRACT

An energy conversion device is provided, including: a first electrical motor control circuit, where the first electrical motor control circuit is connected with a battery pack; a second electrical motor control circuit, where the second electrical motor control circuit is connected with the first electrical motor control circuit in parallel; and a controller, configured to: when operating in a first control mode, control the first electrical motor control circuit to charge and discharge the battery pack to heat the battery pack, and control the second electrical motor control circuit to output torque.

20 Claims, 5 Drawing Sheets

(56) References Cited

FOREIGN PATENT DOCUMENTS

| | | | |
|---|---|---|---|
| CN | 105990624 | A | 10/2016 |
| CN | 205752455 | U | 11/2016 |
| CN | 107181017 | A | 9/2017 |
| CN | 107666028 | A | 2/2018 |
| CN | 107799849 | A | 3/2018 |
| CN | 109228963 | A | 1/2019 |
| CN | 109641531 | A | 4/2019 |
| CN | 109823234 | A | 5/2019 |
| CN | 110116653 | A | 8/2019 |
| CN | 209479443 | U | 10/2019 |
| CN | 209982383 | U | 1/2020 |
| CN | 210225008 | U | 3/2020 |
| CN | 110962631 | A | 4/2020 |
| CN | 111391719 | A | 7/2020 |
| EP | 1903670 | A1 | 3/2008 |
| EP | 2178189 | A1 | 4/2010 |
| EP | 2924875 | A1 | 9/2015 |
| JP | 4365010 | B2 | 11/2009 |
| JP | 2013187919 | A | 9/2013 |
| JP | 5381163 | B2 | 1/2014 |
| JP | 2014078330 | A | 5/2014 |
| JP | 2015213390 | A | 11/2015 |
| JP | 2018-130975 | A | 8/2018 |

\* cited by examiner

ENERGY CONVERSION DEVICE AND VEHICLE

CROSS-REFERENCE TO RELATED APPLICATIONS

The application is a continuation application of International Patent Application No. PCT/CN2021/094356 filed with the China National Intellectual Property Administration (CNIPA) on May 18, 2021, which is based on and claims priority to and benefits of Chinese Patent Application No. 202010502052.4, filed by BYD Co., Ltd. on Jun. 4, 2020 and entitled "ENERGY CONVERSION DEVICE AND VEHICLE". The entire content of the above-referenced applications is incorporated herein by reference.

FIELD

The present disclosure relates to the technical field of vehicles, and more specifically, to an energy conversion device and a vehicle.

BACKGROUND

With widespread use of new energy, a battery pack may be used as a power source in various fields. Performance of the battery pack varies with an environment in which the battery pack is used as the power source. For example, the performance of the battery pack in a low temperature environment is greatly reduced compared to that in a normal temperature environment. For example, a discharging capacity of the battery pack at zero temperature decreases with a decreasing temperature. Under a condition of −30° C., the discharging capacity of the battery pack is basically 0, causing the battery pack to be unusable. In order to be able to use the battery pack in the low temperature environment, the battery pack is required to be preheated before being used.

However, a heating process of the battery pack in the related art cannot be performed in conjunction with a motor driving process. Therefore, a technical solution that enables collaborative implementation of a driving function and a heating function is urgently required.

SUMMARY

An object of the present disclosure is to provide an energy conversion device and a vehicle to realize coordination of driving of a motor and heating of a battery without a complicated control process, and avoid an excessive loss of a motor inverter and a motor winding.

A first aspect of the present disclosure provides an energy conversion device, including:
 a first electrical motor control circuit, connected with a battery pack;
 a second electrical motor control circuit, connected with the first electrical motor control circuit in parallel; and
 a controller, configured to: when operating in a first control mode, control the first electrical motor control circuit to charge and discharge the battery pack to heat the battery pack, and control the second electrical motor control circuit to output torque.

A second aspect of the present disclosure provides a vehicle, including the energy conversion device in the first aspect.

According to the technical solution of the present disclosure, an energy conversion device and a vehicle are provided. The energy conversion device includes a first electrical motor control circuit, a second electrical motor control circuit, a first energy storage module, and a controller. When the controller operates in a first control mode, the controller is configured to control the first motor inverter in the first electrical motor control circuit, and a first battery pack heating circuit is formed by the battery pack, the first motor inverter, and the first motor winding. An internal resistance of the battery pack is heated by the first battery pack heating circuit, and the second motor inverter in the second electrical motor control circuit is controlled to cause the second electrical motor control circuit to output power, thereby realizing the coordination of the heating of the battery and the driving of the motor. In addition, since the first electrical motor control circuit is used for heating and the second electrical motor control circuit is used for driving, an excessive loss of the motor winding and the motor inverter in the motor driving circuit is avoided, and the service life of the components in the circuit is extended.

Additional aspects and advantages of the present disclosure will be set forth, in part, from the following description, and in part will become apparent from the following description, or may be learned by practice of the present disclosure.

BRIEF DESCRIPTION OF THE DRAWINGS

The foregoing and/or additional aspects and advantages of the present disclosure will become apparent and comprehensible in the description of the embodiments made with reference to the following accompanying drawings.

DETAILED DESCRIPTION

Figure 1:
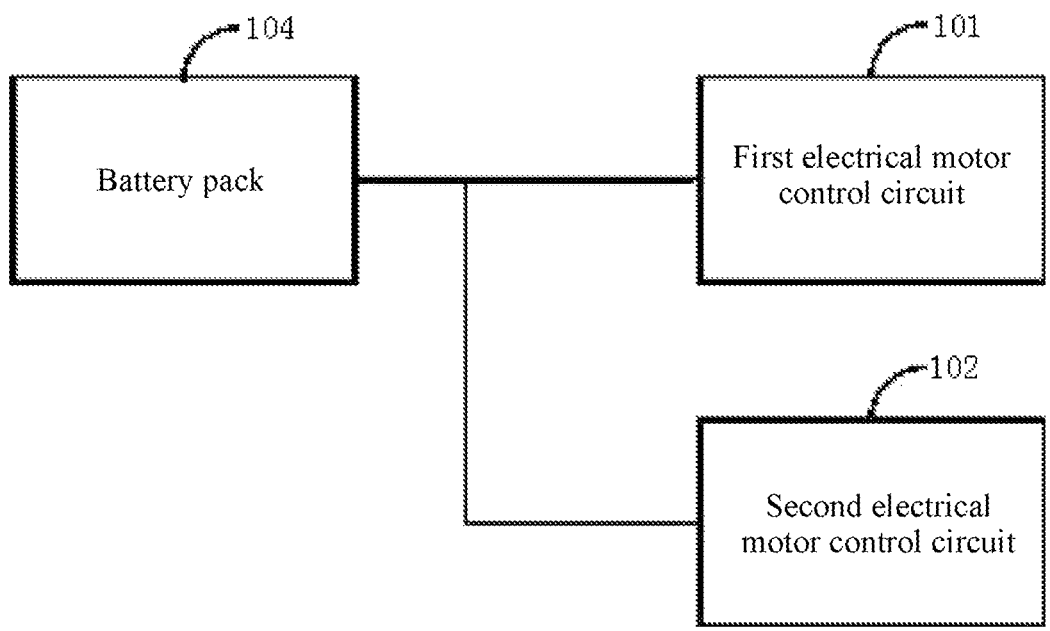
FIG. 1 is a schematic structural diagram of an energy conversion device according to Embodiment I of the present disclosure.

Embodiments of the present disclosure are described in detail below, and examples of the embodiments are shown in accompanying drawings, where the same or similar elements or the elements having same or similar functions are denoted by the same or similar reference numerals throughout the description. The embodiments described below with reference to the accompanying drawings are exemplary, and are intended to explain the present disclosure and cannot be construed as a limitation to the present disclosure.

In order to describe the technical solutions of the present disclosure, specific embodiments are used for description below.

Embodiment I of the present disclosure provides an energy conversion device, as shown in FIG. 1, including:
- a first electrical motor control circuit 101, where the first electrical motor control circuit 101 is connected with a battery pack 104;
- a second electrical motor control circuit 102, where the second electrical motor control circuit 102 is connected with the first electrical motor control circuit 101 in parallel; and
- a controller, configured to: when operating in a first control mode, control the first electrical motor control circuit 101 to charge and discharge the battery pack 104 to heat the battery pack 104, and control the second electrical motor control circuit 102 to output torque.

The energy conversion device of this embodiment includes a first electrical motor control circuit, a second electrical motor control circuit, a first energy storage module, and a controller. The controller is configured to: when operating in the first control mode, control the first motor inverter in the first electrical motor control circuit, to cause the battery pack, the first motor inverter, and the first motor winding to form the first battery pack heating circuit, and heat an internal resistance of the battery pack through the first battery pack heating circuit; and control the second motor inverter in the second electrical motor control circuit to cause the second electrical motor control circuit to output power, thereby realizing the coordination of the heating of the battery and the driving of the motor. In addition, since the first electrical motor control circuit is used for heating and the second electrical motor control circuit is used for driving, an excessive loss of the motor winding and the motor inverter in the motor driving circuit is avoided, and the service life of the components in the circuit is extended.

Figure 2:
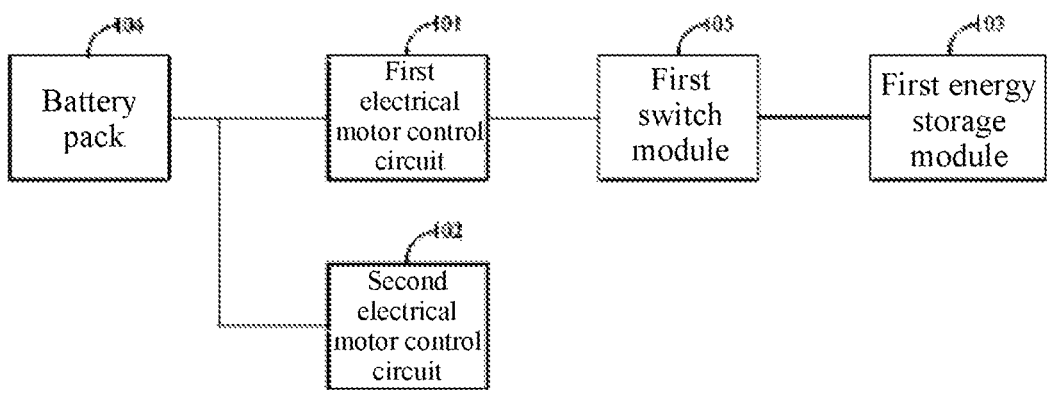
FIG. 2 is another schematic structural diagram of an energy conversion device according to Embodiment I of the present disclosure.

Based on this embodiment, in other embodiments, referring to FIG. 2, the energy conversion device further includes a first energy storage module 103.

The first energy storage module 103 is connected with the first electrical motor control circuit 101 to form a first battery pack heating circuit. The controller is configured to: when operating in a second control mode, control the first electrical motor control circuit to charge and discharge the first energy storage module and the battery pack to heat the battery pack, and control the second electrical motor control circuit to output torque.

According to some embodiments, the first electrical motor control circuit is formed by multiplexing a compressor of the vehicle.

In one embodiment, the first electrical motor control circuit is formed by multiplexing a bridge arm converter of the compressor and a motor winding, thereby reducing use demands for electronic components, and then not only reducing costs but also improving the overall integration level.

The first electrical motor control circuit 101 and the second electrical motor control circuit 102 are two driving circuits connected in parallel. The first electrical motor control circuit 101 and the second electrical motor control circuit 102 are both connected with the battery pack 104. When the battery pack 104 respectively outputs electric energy to the first electrical motor control circuit 101 and the second electrical motor control circuit 102, the first electrical motor control circuit 101 and the second electrical motor control circuit 102 may be caused to output driving force.

The first electrical motor control circuit 101 includes a first motor inverter, a first motor winding, and a first bus capacitor. The first electrical motor control circuit 101 may output power by controlling the first motor inverter. The second electrical motor control circuit 102 includes a second motor inverter, a second motor winding, and a second bus capacitor. The second electrical motor control circuit 102 may output power by controlling the second motor inverter.

The first energy storage module 103 is connected with the first electrical motor control circuit 101 to form the first battery pack heating circuit. When the first electrical motor control circuit 101 includes a first motor inverter, a first motor winding, and a first bus capacitor, the first battery pack heating circuit is formed by the battery pack 104, the first motor inverter, the first motor winding, and the first energy storage module 103. The first battery pack heating circuit includes a discharging circuit and a charging circuit. The discharging circuit means discharging to the first energy storage module 103 by the battery pack 104 through the first motor inverter and the first motor winding. In this case, a current flows out from the battery pack 104, and the current flows into the first energy storage module 103 through the first motor inverter and the first motor winding to charge the first energy storage module 103. The charging circuit means charging of the battery pack 104 by the first energy storage module 103 through the first motor winding and the first motor inverter. In this case, the current flows out from the first energy storage module 103, and flows into the battery pack 104 through the first motor winding and the first motor inverter. Since an internal resistance exists in the battery pack 104, during operation of the discharging circuit and the charging circuit, a current flows into and out from the battery pack 104 to cause the internal resistance of the battery pack 104 to generate heat, thereby increasing the temperature of the battery pack 104.

It can be learned from specific structures of the first electrical motor control circuit 101 and the first battery pack heating circuit that the first motor winding and the first motor inverter respectively form the first electrical motor control circuit 101 and the first battery pack heating circuit. That is to say, the first electrical motor control circuit 101 and the first heating circuit multiplex the first motor winding and the first motor inverter to cause the first motor winding and the first motor inverter to perform both motor driving and heating. In this way, the usage efficiency of the device in the circuit is improved, thereby avoiding the problems of excessively high costs and a complicated circuit caused by separately adding the component.

The controller is configured to: when operating in a second control mode, control at least one phase bridge arm in the first motor inverter to charge and discharge the first energy storage module 103 and the battery pack 104 to cause an internal resistance of the battery pack 104 to generate heat, and control the second motor inverter to cause the second electrical motor control circuit 102 to output the driving force. The second control mode is a mode in which heating and driving of the energy conversion device are controlled to be performed simultaneously. The controller may collect a voltage, a current, and a temperature of the battery pack 104 and a phase current of the motor winding. The controller may include a vehicle controller, a control circuit of a motor controller, and a manager circuit of a BMS of the battery pack 104, which are connected through a CAN line. Different modules in the controller control turn-on and turn-off of at least one phase bridge arm in the first motor inverter according to the acquired information to realize turn-on of different current circuits.

Embodiment I of the present disclosure provides an energy conversion device. The energy conversion device includes a first electrical motor control circuit 101, a second electrical motor control circuit 102, a first energy storage module 103, and a controller. When the controller operates in a second control mode, the controller is configured to control the first motor inverter in the first electrical motor control circuit 101, and the first battery pack heating circuit is formed by the battery pack 104, the first motor inverter, the first motor winding, and the first energy storage module 103. The battery pack 104 is heated by the first battery pack heating circuit, and the second motor inverter in the second electrical motor control circuit 102 is controlled to cause the second electrical motor control circuit 102 to output power, and the heating and the driving of the energy conversion device are performed simultaneously. In addition, since the first electrical motor control circuit 101 is used for heating and the second electrical motor control circuit 102 is used for driving, an excessive loss of the motor winding and the motor inverter in the motor driving circuit is avoided, and the service life of the component in the circuit is extended.

In an implementation, as shown in FIG. 2, the energy conversion device further includes a first switch module 105, where the first switch module 105 is connected between the first electrical motor control circuit 101 and the first energy storage module 103; and a controller, configured to: when operating in the second control mode, control the first switch module 105 to be turned on, control the first electrical motor control circuit 101 to charge and discharge the first energy storage module 103 and the battery pack 104 to heat the battery pack 104, and control the second electrical motor control circuit 102 to output torque.

The first switch module 105 is connected with the controller, and is configured to cause, according to a control signal of the controller, the first electrical motor control circuit 101 and the first energy storage module 103 to be turned on or turned off. In this way, the first electrical motor control circuit 101 is switched between performing heating and performing driving.

In an implementation, the first electrical motor control circuit 101 includes a first motor inverter, a first motor winding, and a first bus capacitor. A first confluent end of the first motor inverter is connected with a positive electrode of the battery pack 104 and a first end of the first bus capacitor. A second confluent end of the first motor inverter is connected with a negative electrode of the battery pack 104 and a second end of the first bus capacitor. A first end of the first motor winding is connected with the first motor inverter, and the first energy storage module 103 and the first switch module 105 are connected between a second end of the motor winding and the second confluent end. The first energy storage module 103 and the first switch module 105 are connected in series.

In an implementation, the second electrical motor control circuit 102 includes a second motor inverter, a second motor winding, and a second bus capacitor. A first confluent end of the second motor inverter is connected with a positive electrode of the battery pack 104 and a first end of the second bus capacitor. A second confluent end of the second motor inverter is connected with a negative electrode of the battery pack 104 and a second end of the second bus capacitor. A first end of the second motor winding is connected with the second motor inverter.

The first motor inverter includes M bridge arms. First ends of all of the M bridge arms are connected together to form the first confluent end of the first motor inverter, and second ends of all of the M bridge arms are connected together to form the second confluent end of the first motor inverter. Each bridge arm includes two power switch units connected in series. The power switch unit may be a transistor, an IGBT, a MOS transistor, and so on. A midpoint of each bridge arm is formed between two power switch units. The first motor winding includes M phase windings. A first end of each phase winding in the M phase windings is connected with a midpoint of each bridge arm in a set of M bridge arms in a one-to-one correspondence, and second ends of all of the M phase windings are connected together to form a neutral line.

When M=3, the first motor inverter is a three-phase inverter. The three-phase inverter includes three bridge arms. First ends of all of the three bridge arms are connected together to form a first confluent end of the first motor inverter, and second ends of all of a set of three bridge arms are connected together to form a second confluent end of the first motor inverter. The three-phase inverter includes a first power switch unit, a second power switch unit, a third power switch unit, a fourth power switch unit, a fifth power switch unit, and a sixth power switch unit. A first bridge arm is formed by the first power switch unit and the fourth power switch unit, a second bridge arm is formed by the second power switch unit and the fifth power switch unit, and a third bridge arm is formed by the third power switch unit and the sixth power switch unit. One end of the first power switch unit, one end of the third power switch unit, and one end of the fifth power switch unit are connected together to form a first confluent end of the three-phase inverter, and one end of the second power switch unit, one end of the fourth power switch unit, and one end of the sixth power switch unit are connected together to form a second confluent end of the three-phase inverter.

The first motor winding includes three phase windings. First ends of all of the three phase windings are connected with midpoints of all of the three bridge arms in a one-to-one correspondence, and second ends of all of the three phase windings are connected together to form a neutral point. A first end of a first phase winding is connected with a midpoint of a first bridge arm, a first end of a second phase winding is connected with a midpoint of a second bridge arm, and a first end of a third phase winding is connected with a midpoint of a third bridge arm.

A structure of the second motor inverter is the same as a structure the first motor inverter, and the details are not described herein again.

In an implementation, the first battery pack heating circuit includes a discharging and energy storage stage, a discharging and energy release stage, a charging and energy storage stage, and a charging and energy release stage. When the first battery pack heating circuit is in the discharging and energy storage stage, a discharging and energy storage circuit is formed by the battery pack 104, the first motor inverter, the first motor winding, the first switch module 105, and the first energy storage module 103.

When the first battery pack heating circuit is in the discharging and energy release stage, a discharging and energy release circuit is formed by the first motor winding, the first switch module 105, the first energy storage module 103, and the first motor inverter.

When the heating circuit is in the charging and energy storage stage, a charging and energy storage circuit is formed by the first energy storage module 103, the first switch module 105, the first motor winding, and the first motor inverter.

When the heating circuit is in the charging and energy release stage, a charging and energy release circuit is formed by the first energy storage module 103, the first switch module 105, the first motor winding, the first motor inverter, and the battery pack 104.

The first battery pack heating circuit includes the discharging circuit and the charging circuit. The discharging circuit includes the discharging and energy storage circuit and the discharging and energy release circuit, and the charging circuit includes the charging and energy storage circuit and the charging and energy release circuit. When the discharging and energy storage circuit is controlled by the first motor inverter to operate, the battery pack 104 outputs electric energy, to cause the first motor winding to store energy. When the discharging and energy release circuit is controlled by the first motor inverter to operate, the battery pack 104 discharges and the motor winding releases energy to charge the first energy storage module 103. When the charging and energy storage circuit is controlled by the first motor inverter to operate, the first energy storage module 103 discharges to charge the battery pack 104, and the motor winding stores energy. When the charging and energy release circuit is controlled by the first motor inverter to operate, the motor winding releases energy to charge the battery pack 104. By controlling the first motor inverter to cause a process of discharging to the first energy storage module 103 from the battery pack 104 and a process of charging the battery pack 104 form the first energy storage module 103 to be alternately performed, the battery pack 104 is heated to increase the temperature of the battery pack 104. In addition, a value of a current flowing through the first battery pack heating circuit is adjusted by controlling a value of a duty cycle of a PWM control signal of the first energy storage module 103. Controlling the duty cycle means controlling an on time of the upper bridge arm and the lower bridge arm. Extending or shortening the on time of the upper bridge arm or the lower bridge arm causes the current in the first battery pack heating circuit to increase or decrease, to cause the heating power generated by the battery pack 104 to be adjusted.

It should be noted that in the process of controlling operation of the discharging circuit and the charging circuit, the discharging and energy storage circuit, the discharging and energy release circuit, the charging and energy storage circuit, and the charging and energy release circuit in the discharging circuit may be controlled to operate in sequence. The value of the current flowing through the first battery pack heating circuit is adjusted by controlling the value of the duty cycle of the PWM control signal of the first motor inverter. Alternatively, the discharging and energy storage circuit and the discharging and energy release circuit in the discharging circuit may be first controlled to be turned on alternately for discharging, and then the first charging and energy storage circuit and the first charging and energy release circuit in the charging circuit are controlled to be turned on alternately for discharging. The values of the currents flowing through the discharging circuit and the charging circuit are respectively adjusted by controlling the value of the duty cycle of the PWM control signal of the first motor inverter.

The technical effect in this implementation is that by controlling the first motor inverter, the first battery pack heating circuit is caused to operate, the battery pack 104 in the discharging circuit is caused to discharge to the first energy storage module 103, and the first energy storage module 103 in the charging circuit is caused to charge the battery pack 104. In this way, the temperature of the battery pack 104 is increased. In addition, the current in the first battery pack heating circuit may be further adjusted by controlling the first motor inverter, thereby adjusting the heating power generated by the battery pack 104.

In an implementation, the controller is configured to: when operating in a third control mode, control the first electrical motor control circuit 101 to output torque, and/or control the second electrical motor control circuit 102 to output torque.

The controller is configured to:

acquire a drive instruction; and acquire the quantity of ready-to-use motor driving circuits according to the drive instruction; and control a corresponding motor driving circuit to operate according to the quantity of motor driving circuits, to enter the third control mode.

When the controller receives the drive instruction and an outputted torque value of the motor acquired by the controller according to the drive instruction is less than a preset torque value, the first electrical motor control circuit 101 is driven to output torque, or the second electrical motor control circuit 102 is driven to output torque. The preset torque value may be determined according to maximum torque outputted by the first electrical motor control circuit 101 and the second electrical motor control circuit 102. When the outputted torque value of the motor acquired by the controller according to the drive instruction is greater than the preset torque value, the first electrical motor control circuit 101 and the second electrical motor control circuit 102 are driven to jointly output the torque.

This implementation is specifically described below by using a specific circuit structure.

Figure 3:
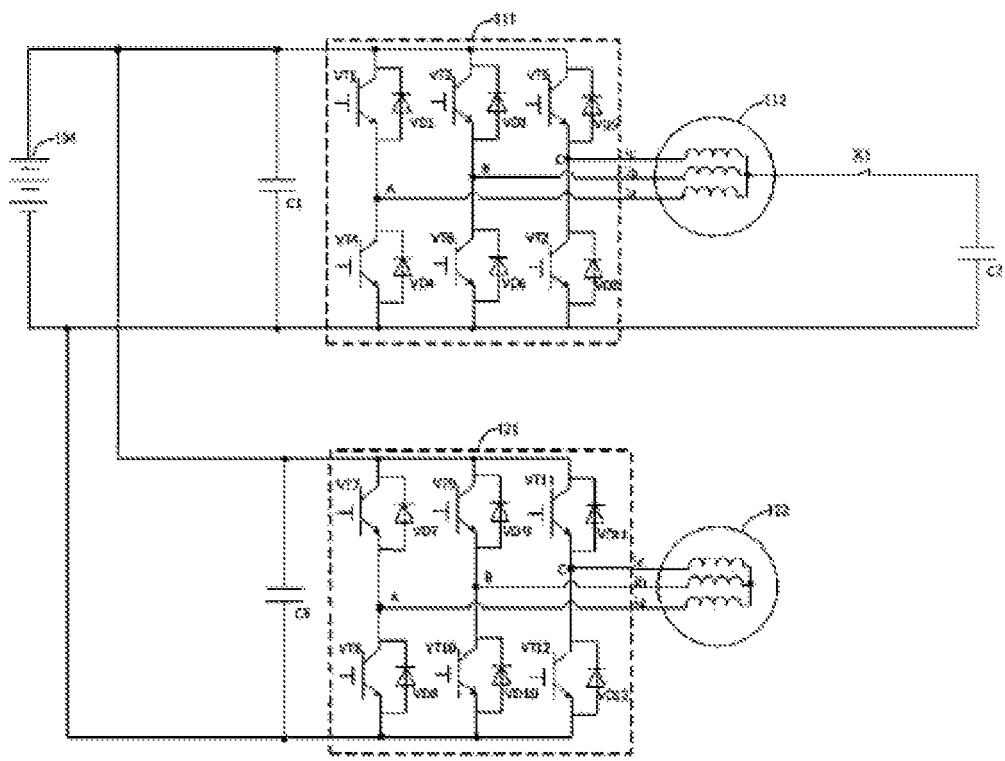
FIG. 3 is a circuit diagram of an energy conversion device according to Embodiment I of the present disclosure.

As shown in FIG. 3, the energy conversion device includes a first bus capacitor C1, a first motor inverter 111, a first motor winding 112, a second bus capacitor C3, a second motor inverter 121, a second motor winding 122, a switch K1, and a capacitor C2. A positive electrode of the battery pack 104 is connected with a first end of the first bus capacitor C1, a first confluent end of the first motor inverter 111, a first end of the second bus capacitor C3, and a first confluent end of the second motor inverter 121. The first motor inverter 111 is connected with the first motor winding 112, the second motor inverter 121 is connected with the second motor winding 122, a neutral point of the first motor winding 112 is connected with a first end of the switch K1, and a second end of the switch K1 is connected with a first end of the capacitor C2. A second end of the capacitor C2 is connected with a second confluent end of the first motor inverter 111, a second end of the first bus capacitor C1, a second confluent end of the second motor inverter 121, and a second end of the second bus capacitor C3.

The first motor inverter 111 is a first three-phase inverter. The first three-phase inverter includes a first power switch unit, a second power switch unit, a third power switch unit, a fourth power switch unit, a fifth power switch unit, and a sixth power switch unit. The first bridge arm is formed by the first power switch unit and the fourth power switch unit, the second bridge arm is formed by the third power switch unit and the sixth power switch unit, and the third bridge arm is formed by the fifth power switch unit and the second power switch unit. One end of the first power switch unit, one end of the third power switch unit, and one end of the fifth power switch unit are connected together to form a first confluent end of the first motor inverter, and one end of the second power switch unit, one end of the fourth power switch unit, and one end of the sixth power switch unit are connected together to form a second confluent end of the first motor inverter. A first phase coil of the first motor winding is connected with a midpoint of the first bridge arm, a second phase coil of the first motor winding is connected with a midpoint of the second bridge arm, and a third phase coil of the first motor winding is connected with a midpoint of the third bridge arm.

The first power switch unit in the first three-phase inverter includes a first upper bridge arm VT1 and a first upper bridge diode VD1, the second power switch unit includes a second lower bridge arm VT2 and a second lower bridge diode VD2, the third power switch unit includes a third upper bridge arm VT3 and a third upper bridge diode VD3, the fourth power switch unit includes a fourth lower bridge arm VT4 and a fourth lower bridge diode VD4, the fifth power switch unit includes a fifth upper bridge arm VT5 and a fifth upper bridge diode VD5, and the sixth power switch unit includes a sixth lower bridge arm VT6 and a sixth lower bridge diode VD6. The first motor winding is a three-phase four-wire system, which may be a permanent magnet synchronous motor or an asynchronous motor. Three phases of the windings are connected at one point to form a neutral point.

The second motor inverter 121 is a second three-phase inverter. The second three-phase inverter includes a seventh power switch unit, an eighth power switch unit, a ninth power switch unit, a tenth power switch unit, an eleventh power switch unit, and a twelfth power switch unit. A fourth bridge arm is formed by the seventh power switch unit and the eighth power switch unit, a fifth bridge arm is formed by the ninth power switch unit and the tenth power switch unit, and a sixth bridge arm is formed by the eleventh power switch unit and the twelfth power switch unit. One end of the seventh power switch unit, one end of the ninth power switch unit, and one end of the eleventh power switch unit are connected together to form the first confluent end of the second motor inverter 121, and one end of the eighth power switch unit, one end of the tenth power switch unit, and one end of the twelfth power switch unit are connected together to form the second confluent end of the second motor inverter 121. A first phase winding of the second motor winding is connected with a midpoint of the fourth bridge arm, a second phase winding of the second motor winding is connected with a midpoint of the fifth bridge arm, and a third phase winding of the second motor winding is connected with a midpoint of the sixth bridge arm.

The seventh power switch unit in the second three-phase inverter includes a seventh upper bridge arm VT7 and a seventh upper bridge diode VD7, the eighth power switch unit includes an eighth lower bridge arm VT8 and an eighth lower bridge diode VD2, the ninth power switch unit includes a ninth upper bridge arm VT9 and a ninth upper bridge diode VD9, the tenth power switch unit includes a tenth lower bridge arm VT10 and a tenth lower bridge diode VD10, the eleventh power switch unit includes an eleventh upper bridge arm VT11 and an eleventh upper bridge diode VD11, and the twelfth power switch unit includes a twelfth lower bridge arm VT12 and a twelfth lower bridge diode VD12. The second motor winding is a three-phase four-wire system, which may be a permanent magnet synchronous motor or an asynchronous motor. The three phase windings are connected at one point to form a neutral point.

During specific implementation, the control method adopted by the controller includes the following steps.

Step S101: A vehicle is normally powered on to a high voltage, that is, the vehicle is in a to-be-driven state.

Step S102: A temperature detection device in the battery pack 104 continuously detects a temperature of the battery pack 104, and continuously sends the temperature value to a power manager BMC in the controller.

Step S103: The BMC performs determination by comparing the temperature value sent by the temperature detection device with a temperature threshold for self-heating of the battery pack 104.

Step S104: When the BMC determines, according to the temperature value of the battery pack 104, that self-heating is not required, the first electrical motor control circuit 101 and the second electrical motor control circuit 102 can be normally driven at unlimited power.

Step S105: When the BMC determines, according to the temperature value of the battery pack 104, that the self-heating is required, the controller controls operation of the first electrical motor control circuit 101 to generate an alternating current to allow the battery pack 104 to perform self-heating, the second electrical motor control circuit 102 may normally operate and drive, the battery pack 104 provides a limited power output, and the process returns to S103.

A specific process of controlling operation of the first electrical motor control circuit 101 by the controller to generate the alternating current to perform the self-heating of the battery pack 104 is as follows.

Figure 4:
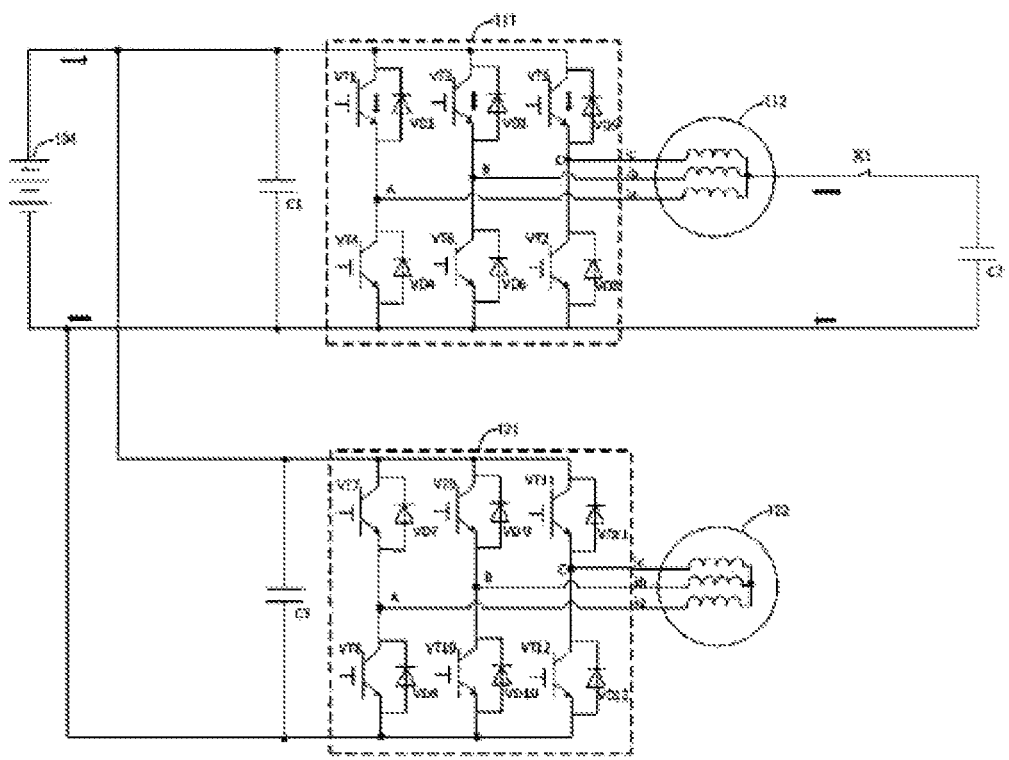
FIG. 4 is a diagram of a flowing direction of a current of an energy conversion device according to Embodiment I of the present disclosure.

A first stage is operation of the discharging and energy storage circuit. As shown in FIG. 4, when an upper bridge arm of a first motor inverter 111 is turned on, a current flows out from a positive electrode of the battery pack 104, and the current flows back to the negative electrode of the battery pack 104 through the upper bridge arms (the first upper bridge arm VT1, the third upper bridge arm VT3, and the fifth upper bridge arm VT5) of the first motor inverter 111, the first motor winding 112, the switch K1, and the capacitor C2, and the current continuously increases. In the process, the battery pack 104 performs discharging to outside, to cause a voltage of the capacitor C2 to continuously increase.

Figure 5:
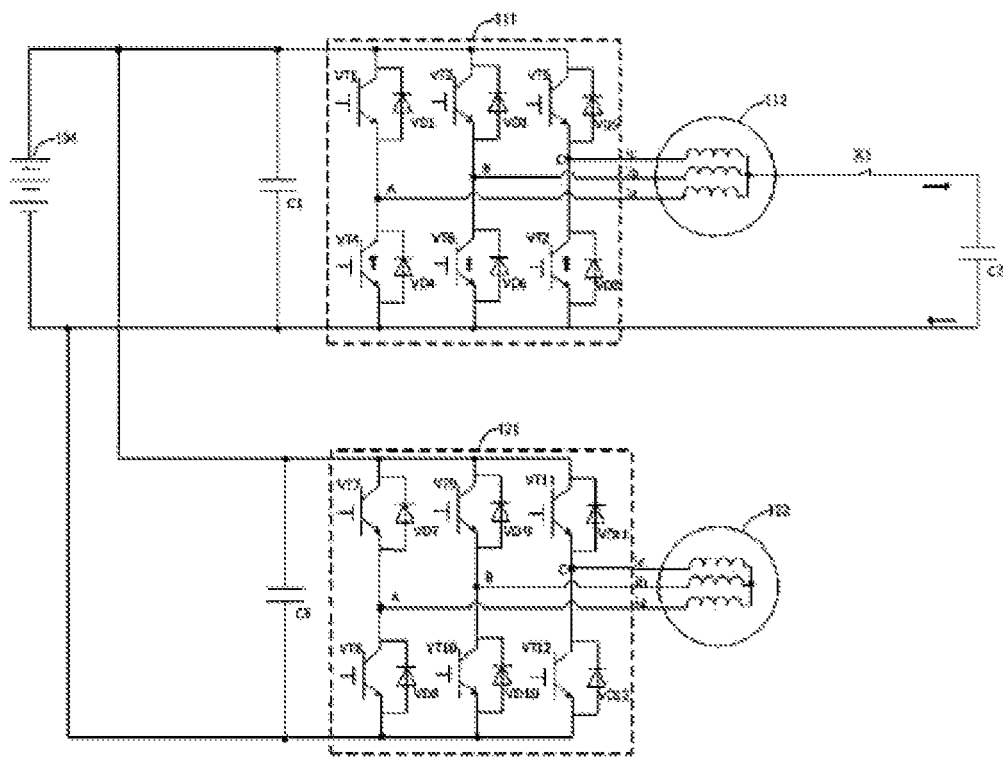
FIG. 5 is a diagram of a flowing direction of a current of an energy conversion device according to Embodiment I of the present disclosure.

A second stage is operation of the discharging and energy release circuit. As shown in FIG. 5, when the upper bridge arm of the first motor inverter 111 is turned off and the lower bridge arm is turned off, a current flows out from a connection point of the first motor winding 112, flows into a positive electrode of the capacitor C2 through the switch K1, and then flows back to the first motor winding 112 through the lower bridge arms (the second lower bridge diode VD2, the fourth lower bridge diode VD4, and the sixth lower bridge diode VD6) of the first motor inverter 111. The current continuously decreases, and the voltage of the capacitor C2 continuously rises. When the current drops to zero, the voltage of the capacitor C2 reaches a maximum value.

Figure 6:
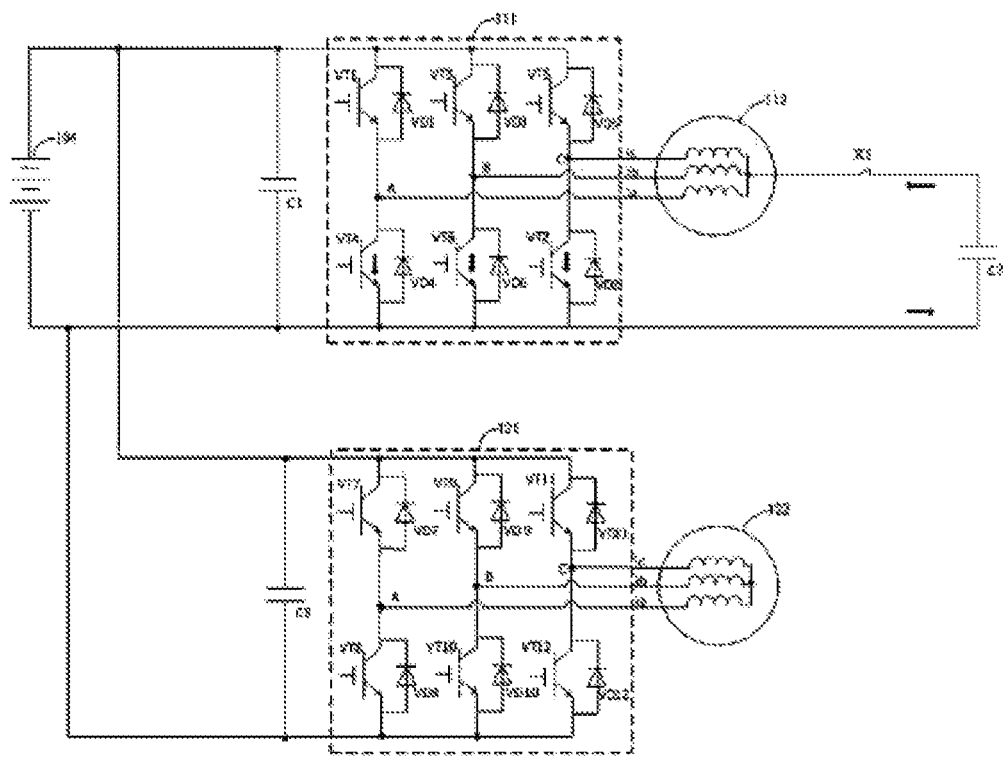
FIG. 6 is a diagram of a flowing direction of a current of an energy conversion device according to Embodiment I of the present disclosure.

A third stage is operation of the charging and energy storage circuit. As shown in FIG. 6, when a lower bridge arm of the first motor inverter 111 is turned on, a current flows out from the positive electrode of the capacitor C2, flows into the first motor winding 112 through the switch K1, and flows back to a negative electrode of the capacitor C2 through the lower bridge arms (the second lower bridge arm VT2, the fourth lower bridge arm VT4, and the sixth lower bridge arm VT6) of the first motor inverter 111.

Figure 7:
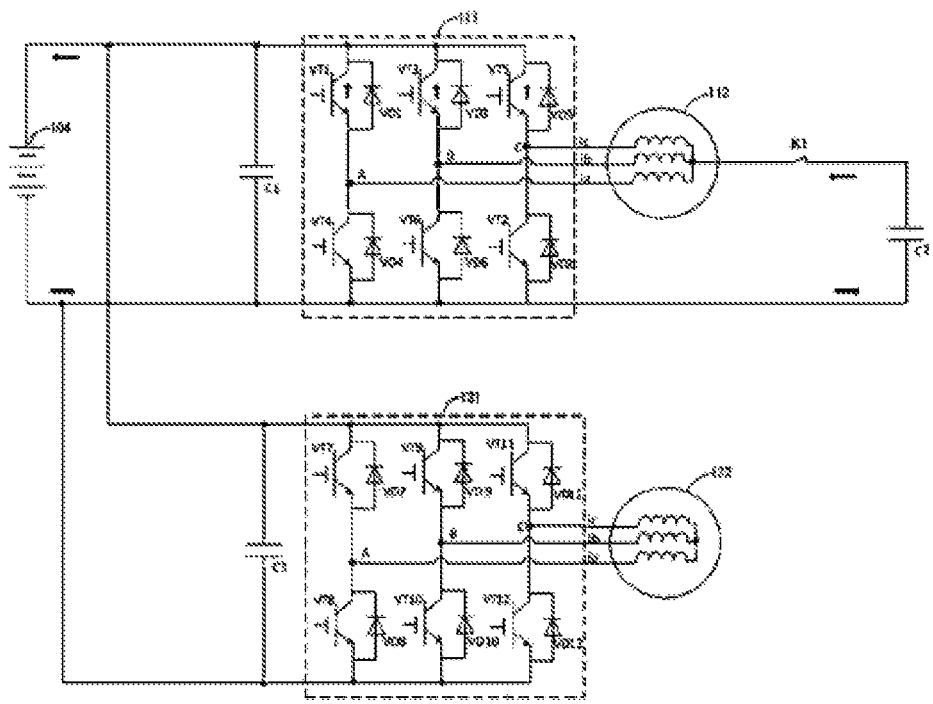
FIG. 7 is a diagram of a flowing direction of a current of an energy conversion device according to Embodiment I of the present disclosure.

A fourth stage is operation of the charging and energy release circuit. As shown in FIG. 7, when the upper bridge arm of the first motor inverter 111 is turned on, a current flows out from the capacitor C2 and the three phase windings of the first motor winding 112, flows into the battery pack 104 through the upper bridge arms (the first upper bridge diode VD1, the third upper bridge diode VD3, and the fifth upper bridge diode VD5) of the motor controller 101, and finally flows back to the capacitor C2.

Through the continuous cycle of the above four processes, the battery pack 104 is continuously and rapidly charged and discharged. Due to existence of the internal resistance of the battery pack 104, a large amount of heat is generated to cause the battery pack 104 to heat up rapidly.

Figure 8:
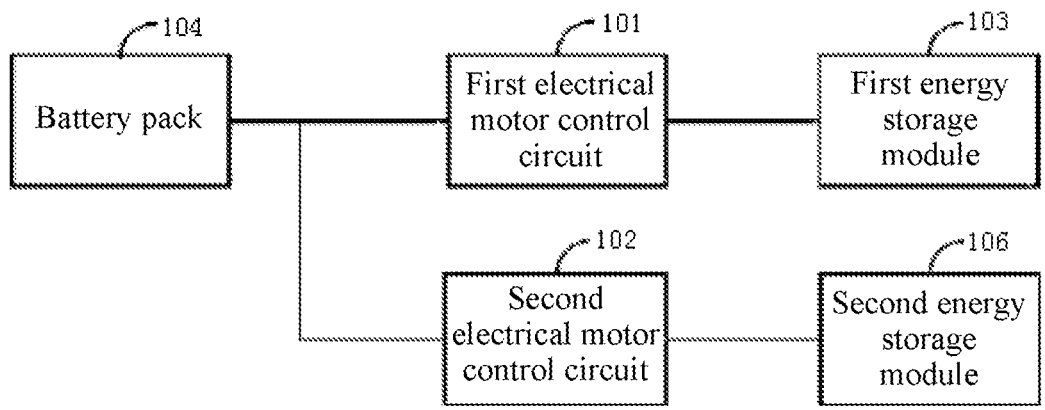
FIG. 8 is a schematic structural diagram of an energy conversion device according to Embodiment II of the present disclosure.

Embodiment II of the present disclosure provides an energy conversion device, as shown in FIG. 8, including:

a first electrical motor control circuit 101, where the first electrical motor control circuit 101 is connected with a battery pack 104;

a second electrical motor control circuit 102, where the second electrical motor control circuit 102 is connected with the first electrical motor control circuit 101 in parallel; and a first energy storage module 103, where the first energy storage module 103 is connected with the first electrical motor control circuit 101 to form a first battery pack heating circuit; and a second energy storage module 106, where the second energy storage module 106 is connected with the second electrical motor control circuit 102 to form a second battery pack heating circuit.

The controller is configured to: when operating in a second control mode, control the first electrical motor control circuit 101 to charge and discharge the first energy storage module 103 and the battery pack 104 to heat the battery pack 104, and control the second electrical motor control circuit 102 to output torque; or control the second electrical motor control circuit 102 to charge and discharge the second energy storage module 106 and the battery pack 104 to heat the battery pack 104, and control the first electrical motor control circuit 101 to output torque.

A difference between Embodiment II and Embodiment I is that the energy conversion device further includes the second energy storage module 106. The second energy storage module 106 is connected with the second electrical motor control circuit 102 to form a second battery pack heating circuit. When the second electrical motor control circuit 102 includes a second motor inverter, a second motor winding, and a second bus capacitor, the second battery pack heating circuit is formed by the battery pack 104, the second motor inverter, the second motor winding, and the second energy storage module 106. The second battery pack heating circuit includes a discharging circuit and a charging circuit. The discharging circuit means discharging to the second energy storage module 106 by the battery pack 104 through the second motor inverter and the second motor winding. In this case, a current flows out from the battery pack 104, and the current flows into the second energy storage module 106 through the second motor inverter and the second motor winding to charge the second energy storage module 106. The charging circuit means charging of the battery pack 104 by the second energy storage module 106 through the second motor winding and the second motor inverter. In this case, the current flows out from the second energy storage module 106, and flows into the battery pack 104 through the second motor winding and the second motor inverter. Since an internal resistance exists in the battery pack 104, during operation of the discharging circuit and the charging circuit, a current flows into and out from the battery pack 104, to cause the internal resistance of the battery pack 104 to generate heat, thereby increasing the temperature of the battery pack 104.

The controller is configured to: when operating in a second control mode, control at least one phase bridge arm in the first motor inverter to charge and discharge the first energy storage module 103 and the battery pack 104, to cause an internal resistance of the battery pack 104 to generate heat; control the second motor inverter to cause the second electrical motor control circuit 102 to output a driving force; or control at least one phase bridge arm in the second motor inverter to charge and discharge the second energy storage module 106 and the battery pack 104, and the internal resistance of the battery pack 104 generates heat; and control the first motor inverter to cause the first electrical motor control circuit 101 to output the driving force.

Embodiment I of the present disclosure provides an energy conversion device. The energy conversion device includes a first electrical motor control circuit 101, a second electrical motor control circuit 102, a first energy storage module 103, a second energy storage module 106, and a controller. When the controller operates in a second control mode, the controller is configured to control the first motor inverter in the first electrical motor control circuit 101, and the first battery pack heating circuit is formed by the battery pack 104, the first motor inverter, the first motor winding, and the first energy storage module 103. The battery pack 104 is heated by the first battery pack heating circuit, and the second motor inverter in the second electrical motor control circuit 102 is controlled to cause the second electrical motor control circuit 102 to output power. Alternatively, the controller controls the second motor inverter in the second electrical motor control circuit 102, and the second battery pack heating circuit is formed by the battery pack 104, the second motor inverter, the second motor winding, and the second energy storage module 106. The battery pack 104 is heated by the second battery pack heating circuit, and the first motor inverter in the first electrical motor control circuit 101 is controlled to cause the first electrical motor control circuit 101 to output power, and the heating and driving of the energy conversion device are simultaneously performed. In addition, since one motor driving circuit is used for heating and the other motor driving circuit is used for driving, an excessive loss of motor windings and motor inverters in the motor driving circuit is avoided, and the service life of the components in the circuit is extended.

In an implementation, the controller is configured to: when operating in a third control mode, control the first electrical motor control circuit 101 to output torque, and/or control the second electrical motor control circuit 102 to output torque.

The controller is configured to:
acquire a drive instruction; and
acquire the quantity of ready-to-use motor driving circuits according to the drive instruction; and control a corresponding motor driving circuit to operate according to the quantity of motor driving circuits, to enter the third control mode.

When the controller receives the drive instruction and an outputted torque value of the motor acquired by the controller according to the drive instruction is less than a preset torque value, the first electrical motor control circuit 101 is driven to output torque, or the second electrical motor control circuit 102 is driven to output torque. The preset torque value may be determined according to maximum torque outputted by the first electrical motor control circuit 101 and the second electrical motor control circuit 102.

When the outputted torque value of the motor acquired by the controller according to the drive instruction is greater than the preset torque value, the first electrical motor control circuit 101 and the second electrical motor control circuit 102 are driven to jointly output the torque.

In an implementation, the controller is configured to: when operating in a fourth control mode, control the first electrical motor control circuit 101 to charge and discharge the first energy storage module 103 and the battery pack 104 to heat the battery pack 104, and/or control the second electrical motor control circuit 102 to charge and discharge the second energy storage module 106 and the battery pack 104 to heat the battery pack 104.

The controller is configured to: acquire the temperature of the battery pack 104 when the vehicle is in a parking state, and compare the temperature of the battery pack 104 with a preset temperature value; and acquire the quantity of ready-to-use battery pack heating circuits according to a comparison result, and control a corresponding motor electronic control module to operate according to the quantity of the battery pack heating circuits, to enter the fourth control mode.

When the controller receives the temperature of the battery pack 104 and the temperature of the battery pack 104 is less than a first preset value and greater than or equal to a second preset value, one ready-to-use battery pack heating circuit is acquired, and in this case, the first battery pack heating circuit or the second battery pack heating circuit may be selected to operate. When the temperature of the battery pack 104 is less than the second preset value, two ready-to-use battery pack heating circuits are acquired, and in this case, the first battery pack heating circuit and the second battery pack heating circuit may be selected to operate.

Figure 9:
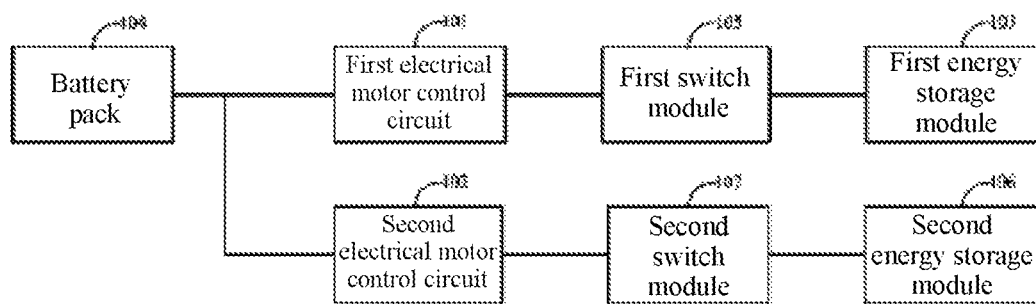
FIG. 9 is another schematic structural diagram of an energy conversion device according to Embodiment II of the present disclosure.

In an implementation, as shown in FIG. 9, the energy conversion device further includes a second switch module 107. The second switch module 107 is connected between the second electrical motor control circuit 102 and the second energy storage module 106.

The second electrical motor control circuit 102 includes a second motor inverter, a second motor winding, and a second bus capacitor. A first confluent end of the second motor inverter is connected with a positive electrode of the battery pack 104 and a first end of the second bus capacitor. A second confluent end of the second motor inverter is connected with a negative electrode of the battery pack 104 and a second end of the second bus capacitor. A first end of the second motor winding is connected with the second motor inverter, and the second energy storage module 106 and the second switch module 107 are connected between a second end of the motor winding and the second confluent end. The second energy storage module 106 and the second switch module 107 are connected in series.

The second switch module 107 is connected with the controller, and is configured to cause, according to a control signal of the controller, the second electrical motor control circuit 102 and the second energy storage module 106 to be turned on or turned off. In this way, the second electrical motor control circuit 102 is switched between performing heating and performing driving.

The energy conversion device in FIG. 9 can operate in different control modes, and specific operation modes are as follows.

A first operation mode: When the controller is configured to: when operating in the second control mode (a drive heating control mode), turn on the first switch module 105 and turn off the second switch module 107, where the first battery pack heating circuit is formed by the battery pack 104, the first motor inverter, the first motor winding, the first switch module 105, and the first energy storage module 103, and the second electrical motor control circuit is formed by the battery pack 104, the second bus capacitor, the second motor inverter, and the second motor winding form, or turn off the first switch module 105 and turn on the second switch module 107, where the second battery pack heating circuit is formed by the battery pack 104, the second motor inverter, the second motor winding, the second switch module 107, and the second energy storage module 106, and the first electrical motor control circuit is formed by the battery pack 104, the first bus capacitor, the first motor inverter, and the first motor winding.

In the second control mode, when the first battery pack heating circuit operates, a first discharging and energy storage circuit is formed by the battery pack 104, the first motor inverter, the first motor winding, the first switch module 105, and the first energy storage module 103, and a first discharging and energy release circuit is formed by the first motor inverter, the first motor winding, the first switch module 105, and the first energy storage module 103. A first charging and energy storage circuit is formed by the first energy storage module 103, the first switch module 105, the first motor winding, and the first motor inverter, and a first charging and energy release circuit is formed by the first energy storage module 103, the first switch module 105, the first motor winding, the first motor inverter, and the battery pack 104.

In the second control mode, when the second battery pack heating circuit operates, a second discharging and energy storage circuit is formed by the battery pack 104, the second motor inverter, the second motor winding, the second switch module 107, and the second energy storage module 106, and a second discharging and energy release circuit is formed by the second motor inverter, the second motor winding, the second switch module 107, and the second energy storage module 106. A second charging and energy storage circuit is formed by the second energy storage module 106, the second switch module 107, the second motor winding, and the second motor inverter, and a second charging and energy release circuit is formed by the second energy storage module 106, the second switch module 107, the second motor winding, the second motor inverter, and the battery pack 104.

A second operation mode: When the controller is configured to: when operating in the third control mode (a drive control mode), turn off the first switch module 105 and turn on the second switch module 107, where the first electrical motor control circuit is formed by the battery pack 104, the first bus capacitor, the first motor inverter, and the first motor winding, and/or the second electrical motor control circuit is formed by the battery pack 104, the second bus capacitor, the second motor inverter, and the second motor winding.

A third operation mode: When the controller is configured to: when operating in the fourth control mode (a heating control mode), turn on the first switch module 105 and turn off the second switch module 107, where the first battery pack heating circuit is formed by the battery pack 104, the first motor inverter, the first motor winding, the first switch module 105, and the first energy storage module 103; or
turn off the first switch module 105 and turn on the second switch module 107, where the second battery pack heating circuit is formed by the battery pack 104, the second motor inverter, the second motor winding, the second switch module 107, and the second energy storage module 106; or turn on the first switch module 105 and turn on the second switch module 107, where the first battery pack heating circuit is formed by the battery pack 104, the first motor inverter, the first motor winding, the first switch module 105, and the first energy storage module 103, and the second battery pack heating circuit is formed by the battery pack 104, the second motor inverter, the second motor winding, the second switch module 107, and the second energy storage module 106.

The energy conversion device provided in this implementation may operate in three control modes. The second control mode is the drive heating control mode, in which the internal resistance of the battery pack is heated to generate heat while the vehicle is caused to be driven. One motor driving circuit is used for driving, and the other motor driving circuit is used for heating. In the third control mode, one or two motor driving circuits are selected to output power according to the required drive power. In the fourth control mode, one or two motor driving circuits are selected for heating according to the temperature of the battery pack. In this implementation, the controller may control the operation of different quantities of motor driving circuits and battery pack heating circuits according to the control modes, thereby realizing different functions.

In an implementation, the energy conversion device in FIG. 9 may further be switched between different control modes, specifically including the following situations.

A first switching mode is to switch from the fourth control mode to the first control mode. A specific switching process is as follows.

When the vehicle is required to output power during the heating, before the controller operates in the second control mode, the controller is further configured to:
  receive a drive instruction when operating in the fourth control mode;
  acquire a temperature of the battery pack 104 when the first battery pack heating circuit is in an operating state and the second electrical motor control circuit 102 is in an idle state;
  control the first battery pack heating circuit to enter the operating state when it is detected that the temperature of the battery pack 104 does not satisfy a driving condition; control the second electrical motor control circuit 102 to output torque to enter the second control mode when the temperature of the battery pack 104 satisfies the driving condition;
  control the second electrical motor control circuit 102 to output torque to enter the second control mode when it is detected that the temperature of the battery pack 104 satisfies the driving condition;
  acquire the temperature of the battery pack 104 when the first battery pack heating circuit and the second battery pack heating circuit are both in the operating state; control the first battery pack heating circuit and the second battery pack heating circuit to heat the battery pack 104 when it is detected that the temperature of the battery pack 104 does not satisfy the driving condition; control the second electrical motor control circuit to output torque or control the first electrical motor control circuit to output torque to enter the second control mode when the temperature of the battery pack 104 satisfies the driving condition;
  control the second electrical motor control circuit to output torque or control the first electrical motor control circuit to output torque to enter the second control mode when it is detected that the temperature of the battery pack 104 satisfies the driving condition.

This implementation adapts to a scenario where the vehicle is required to output power during the heating, and the controller realizes the switching between the second control mode and the fourth control mode, to cause the energy conversion device to quickly adapt to the switching of different scenarios.

A first switching mode is to switch from the fourth control mode to the first control mode. A specific switching process is as follows.

In an implementation, when the vehicle is required to be heated in the process of outputting power, before the controller operates in the second control mode, the controller is further configured to:
  receive a heating instruction when operating in the third control mode;
  control the second battery pack heating circuit to be in an operating state to enter the second control mode when the first electrical motor control circuit 101 outputs torque and the second electrical motor control circuit 102 is in an idle state; and
  control the second battery pack heating circuit to be in an operating state to enter the second control mode when the first electrical motor control circuit 101 and the second electrical motor control circuit 102 both output torque.

This implementation adapts to a scenario where the vehicle is required to be heated during driving, and the controller realizes the switching between the second control mode and the third control mode, to cause the energy conversion device to quickly adapt to the switching of different scenarios.

When the controller is configured in different control modes, the controller controls the power to be outputted or heating to be performed by controlling the motor inverter in the motor driving circuit. The specific manner of controlling the motor inverter by the controller is as follows.

In an implementation, the motor inverter includes N bridge arms. First ends of all of the N bridge arms are connected together to form a first confluent end, and second ends of all of the N bridge arms are connected together to form a second confluent end. The battery pack 104 is connected between the first confluent end and the second confluent end.

The motor winding includes N phase windings. The N phase windings are correspondingly connected with midpoints of all of the N bridge arms. A neutral point of the N phase windings is connected with a first end of the energy storage module, and a second end of the energy storage module is connected with the second confluent end.

The controller controls each bridge arm of the N bridge arms to operate cyclically in sequence, to cause a charging and discharging circuit to operate.

The N bridge arms include CN pairs of bridge arms. Every two bridge arms form one pair of bridge arms, and the controller controls each pair of bridge arms of the CN pairs of bridge arms to operate cyclically in sequence, to cause the charging and discharging circuit to operate.

According to this implementation, when the controller controls the motor inverter to operate, the controller controls at least one phase bridge arm in the motor inverter, which can be described by using the following example. For example, a phase A bridge arm is formed by a first power switch unit and a fourth power switch unit in the motor inverter, a phase B bridge arm is formed by a third power switch unit and a sixth power switch unit, and a phase C bridge arm is formed by an input terminal of a fifth power switch unit and a second power switch unit. The phase A bridge arm of the motor inverter is connected with a first phase winding of the motor windings, the phase B bridge arm of the motor inverter is connected with a second phase winding of the motor windings, and the phase C bridge arm of the motor inverter is connected with a third phase winding of the motor windings. The control mode of the motor inverter may be any one or combination of several of the following: for example, a total of 7 control modes for any one, two or three of the phase A bridge arm, the phase B bridge arm, or the phase C bridge arm, which is flexible and simple. The switching of the bridge arms can be beneficial to realize choices of large, medium, and small heating power. For example, for low-power charging and discharging, a power switch of any of the phase bridge arms can be selected for control, and the three phase bridge arms can be switched in turn. For example, the phase A bridge arm first operates alone to control the first power switch unit and the fourth power switch unit to perform heating for a period of time; then the phase B bridge arm operates alone to control the third power switch unit and the sixth power switch unit to perform heating for the same period of time; then the phase C bridge arm operates alone to control the fifth power switch unit and the second power switch unit to perform heating for the same period of time; and then the phase A bridge arm operates. In this cycle, the motor inverter and the motor windings are alternately energized to generate heat, to cause the heating of the three phases to be more balanced.

For medium-power charging and discharging, power switches of any two of the phase bridge arms can be selected for control, and the three phase bridge arms may be switched in turn. For example, the phase A bridge arm and the phase B bridge arm operate first to control the first power switch unit, the fourth power switch unit, the third power switch unit, and the sixth power switch unit to perform heating for a period of time; then the phase B bridge arm and the phase C bridge arm operate to control the third power switch unit, the sixth power switch unit, the sixth power switch unit and the second power switch unit to perform heating for the same period of time; then the phase C bridge arm and the phase A bridge arm operate to control the fifth power switch unit, the second power switch unit, the first power switch unit, and the fourth power switch unit to perform heating for the same period of time; and then the phase A bridge arm and the phase B bridge arm operate. In this cycle, more balanced heating of the motor inverter and the motor winding is achieved. For example, for high-power charging and discharging, power switches of the three phase bridge arms can be selected for control, and since a three-phase circuit is theoretically balanced, currents of the three phases are balanced, which achieve balanced heating of the motor inverter and the motor winding. Currents of the three phases are essentially direct currents, which have the basically same average value. Due to the symmetry of the three phase windings, three-phase composite magnetomotive force inside the motor is basically zero at this time, therefore magnetic field intensity of a stator is basically zero, and the motor basically generates no torque, which is beneficial to greatly reduce the stress of a transmission system.

This implementation is specifically described below by using a specific circuit structure.

Figure 10:
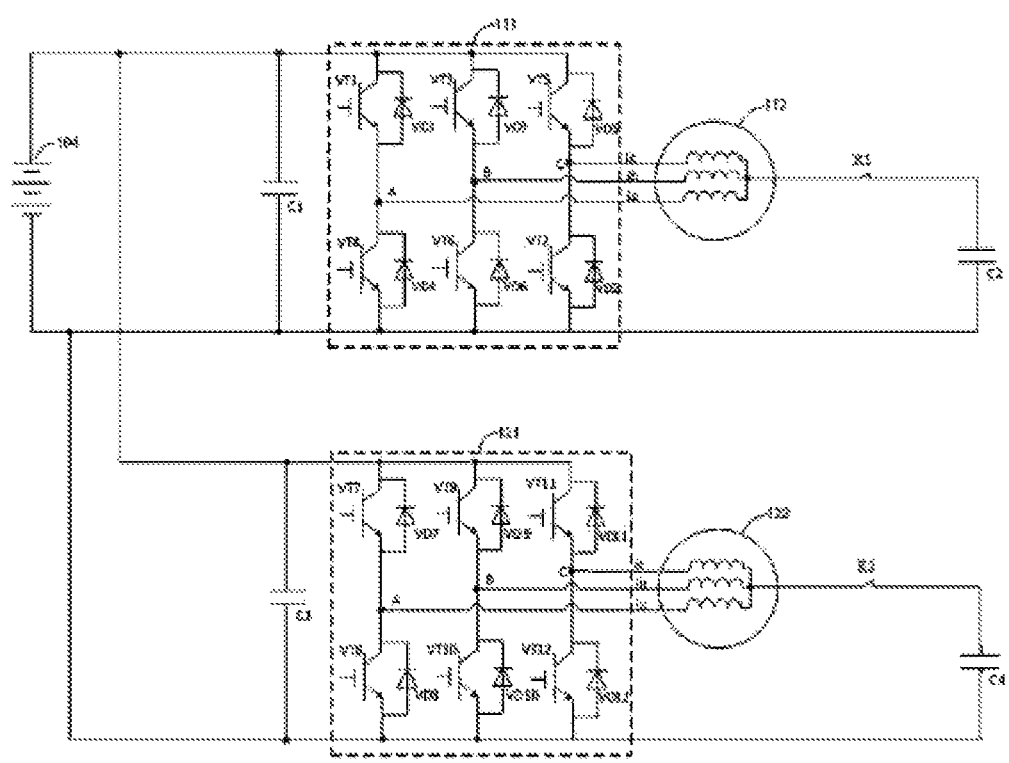
FIG. 10 is a circuit diagram of an energy conversion device according to Embodiment II of the present disclosure.

As shown in FIG. 10, the energy conversion device includes a first bus capacitor C1, a first motor inverter 111, a first motor winding 112, a second bus capacitor C3, a second motor inverter 121, a second motor winding 122, a switch K1, a switch K2, and a capacitor C4. A positive electrode of the battery pack 104 is connected with a first end of the first bus capacitor C1, a first confluent end of the first motor inverter 111, a first end of the second bus capacitor C3, and a first confluent end of the second motor inverter 121. The first motor inverter 111 is connected with the first motor winding 112, the second motor inverter 121 is connected with the second motor winding 122, a neutral point of the first motor winding 112 is connected with a first end of the switch K1, and a second end of the switch K1 is connected with a first end of a capacitor C2. A neutral point of the second motor winding 122 is connected with a first end of the switch K2, and a second end of the switch K2 is connected with a first end of the capacitor C4. A second end of the capacitor C2 is connected with a second confluent end of the first motor inverter 111, a second end of the first bus capacitor C1, a second confluent end of the second motor inverter 121, a second end of the second bus capacitor C3, and a second end of the capacitor C4.

Based on this circuit structure, the controller controls the first electrical motor control circuit and the second electrical motor control circuit to realize functions including driving by one motor and heating by another motor, or heating by both motors, including the following steps.

Step S201: The vehicle is in a parking state.

Step S202: A temperature detection device continuously detects a temperature of the battery pack 104, and the temperature value is sent to a BMC.

Step S203: The BMC determines whether the temperature value of the battery pack 104 reaches a temperature threshold for initiating self-heating of the battery pack 104.

Step S204: If the temperature value of the battery pack 104 does not reach the temperature threshold for initiating self-heating of the battery pack 104, a battery pack heating circuit is not initiated.

Step S205: The BMC determines whether the temperature value of the battery pack 104 reaches the temperature threshold for simultaneously initiating the self-heating of the battery pack 104 by two motor driving circuits.

Step S206: When the temperature value of the battery pack 104 does not reach the temperature threshold for simultaneously initiating the self-heating of the battery pack 104 by the two electrical motor control circuits, the first electrical motor control circuit 101 does not operate, and the second electrical motor control circuit 102 operates in the self-heating state of the battery, or the first electrical motor control circuit 101 operates in the self-heating state of the battery, and the second electrical motor control circuit 102 does not operate; and when the temperature value of the battery pack 104 is less than a certain threshold, the first electrical motor control circuit 101 and the second electrical motor control circuit 102 simultaneously operate in the self-heating state of the battery pack 104, and S205 is performed upon completion.

When the temperature value of the battery pack 104 is reduced to another threshold, the first electrical motor control circuit 101 and the second electrical motor control circuit 102 cyclically enter the self-heating state, which reduces the loss during the operation of the motor driving circuit and extends the life of the motor driving circuit. In addition, when the temperature of a certain motor driving circuit is excessively high, the motor is switched to another motor for heating.

The controller may further be configured to perform a polling-based control method, and provide a control method for switching between two bridge arms in a self-heating process, including the following steps.

Step S81: The first electrical motor control circuit 101 enters a self-heating state.

Step S82: The self-heating process of one cycle from FIG. 4 to FIG. 7 is completed by using a first phase bridge arm, a second phase bridge arm, a phase A1 winding, a phase B1 winding, and a capacitor C2.

Step S83: The self-heating process of one cycle from FIG. 4 to FIG. 7 is completed by using the first phase bridge arm, a third phase bridge arm, the phase A1 winding, a phase C1 winding, and the capacitor C2.

Step S84: The self-heating process of one cycle from FIG. 4 to FIG. 7 is completed by using a second phase bridge arm, the third phase bridge arm, the phase B1 winding, the phase C1 winding, and the capacitor C2.

After step S84 is completed, S82 is performed, that is, the three heating cycles from S82 to S84 are cyclically performed, and only two bridge arms and two inductors are used in each cycle.

The controller may further be configured to perform a polling-based control method, and provide a control method for switching between two bridge arms in a self-heating process, including the following steps.

Step S91: The first electrical motor control circuit 101 enters a self-heating state.

Step S92: The self-heating process of one cycle from FIG. 4 to FIG. 7 is completed by using a first phase bridge arm, a phase A1 winding, and a capacitor C2.

Step S93: The self-heating process of one cycle from FIG. 4 to FIG. 7 is completed by using a second phase bridge arm, a phase B1 winding, and the capacitor C2.

Step S94: The self-heating process of one cycle from FIG. 4 to FIG. 7 is completed by using a third phase bridge arm, a phase C1 winding, and the capacitor C2.

After step S94 is completed, S92 is performed, that is, the three heating cycles from S92 to S94 are cyclically performed, and only one bridge arm and one winding inductor are used in each cycle.

Embodiment III of the present disclosure provides a vehicle, including the energy conversion device in Embodiment I.

In the description of the present disclosure, it should be understood that orientation or position relationships indicated by the terms such as "center", "longitudinal", "transverse", "length", "width", "thickness", "on", "below", "front", "back", "left", "right", "vertical", "horizontal", "top", "bottom", "inside", "outside", "clockwise", "anticlockwise", "axial direction", "radial direction", and "circumferential direction" are based on orientation or position relationships shown in the accompanying drawings, and are used only for ease and brevity of illustration and description, rather than indicating or implying that the mentioned apparatus or component needs to have a particular orientation or needs to be constructed and operated in a particular orientation. Therefore, such terms should not be construed as limiting of the present disclosure.

In addition, the terms "first" and "second" are used for descriptive purposes only and are not to be construed as indicating or implying relative importance or implicitly indicating the number of technical features indicated. Therefore, features defining "first" and "second" may explicitly or implicitly include one or more such features. In the descriptions of the present disclosure, "a plurality of" means more than two, unless otherwise definitely and specifically limited.

In the present disclosure, unless expressly stated and defined otherwise, the terms "mounting", "connected", "connection", "fixed", etc. are to be construed broadly, for example, as fixed connection, detachable connection or integral connection, as mechanical connection or electrical connection, and as direct connection or indirect connection via an intermediary or communication inside two elements or interaction between two elements. A person of ordinary skill in the art may understand the specific meanings of the foregoing terms in the present disclosure according to specific situations.

In the present disclosure, unless expressly stated and defined otherwise, a first feature "on" or "beneath" a second feature may be that the first and second features are in direct contact, or that the first and second features are in indirect contact via an intermediary. Moreover, the first feature "over", "above" and "up" the second feature may be that the first feature is directly above or obliquely above the second feature, or simply indicates that a horizontal height of the first feature is higher than that of the second feature. The first feature "under", "below" and "down" the second feature may be that the first feature is directly below or obliquely below the second feature, or simply indicates that a horizontal height of the first feature is less than that of the second feature.

In the descriptions of this specification, a description of a reference term such as "an embodiment", "some embodiments", "an example", "a specific example", or "some examples" means that a specific feature, structure, material, or characteristic that is described with reference to the embodiment or the example is included in at least one embodiment or example of the present disclosure. In this specification, schematic descriptions of the foregoing terms are not necessarily directed at the same embodiment or example. Besides, the specific features, the structures, the materials or the characteristics that are described may be combined in proper manners in any one or more embodiments or examples. In addition, different embodiments or examples described in the present specification, as well as features of different embodiments or examples, may be integrated and combined by those skilled in the art without contradicting each other.

Although the embodiments of the present disclosure are shown and described above, it may be understood that the foregoing embodiments are exemplary, and cannot be understood as a limitation to the present disclosure. A person of ordinary skill in the art may make changes, modifications, replacements, and variations to the foregoing embodiments without departing from the scope of the present disclosure

What is claimed is:

1. An energy conversion device, comprising:
    a first electrical motor control circuit, connected with a battery pack;
    a second electrical motor control circuit, connected with the first electrical motor control circuit in parallel; and
    a controller, configured to: when operating in a first control mode, control the first electrical motor control circuit to charge and discharge the battery pack to heat the battery pack, and control the second electrical motor control circuit to output torque.

2. The energy conversion device according to claim 1, further comprising:
    a first energy storage module, connected with the first electrical motor control circuit to form a first battery pack heating circuit, wherein
    the controller is configured to: when operating in a second control mode, control the first electrical motor control circuit to charge and discharge the first energy storage module and the battery pack to heat the battery pack, and control the second electrical motor control circuit to output torque.

3. The energy conversion device according to claim 1, wherein the controller is configured to: when operating in a third control mode, control the first electrical motor control circuit to output torque, and/or control the second electrical motor control circuit to output torque.

4. The energy conversion device according to claim 2, further comprising:
a first switch module, connected between the first electrical motor control circuit and the first energy storage module, wherein
the controller is configured to: when operating in the second control mode, control the first switch module to be turned on, control the first electrical motor control circuit to charge and discharge the first energy storage module and the battery pack to heat the battery pack, and control the second electrical motor control circuit to output torque.

5. The energy conversion device according to claim 4, wherein the first electrical motor control circuit comprises a first motor inverter, a first motor winding and a first bus capacitor; a first confluent end of the first motor inverter is connected with a positive electrode of the battery pack and a first end of the first bus capacitor; a second confluent end of the first motor inverter is connected with a negative electrode of the battery pack and a second end of the first bus capacitor; a first end of the first motor winding is connected with the first motor inverter; the first energy storage module and the first switch module are connected between a second end of the first motor winding and the second confluent end; and the first energy storage module and the first switch module are connected in series.

6. The energy conversion device according to claim 5, further comprising:
a second energy storage module, connected with the second electrical motor control circuit to form a second battery pack heating circuit, wherein
the controller is configured to: when operating in the second control mode, control the first electrical motor control circuit to charge and discharge the first energy storage module and the battery pack to heat the battery pack, and control the second electrical motor control circuit to output torque; or
control the second electrical motor control circuit to charge and discharge the second energy storage module and the battery pack to heat the battery pack, and control the first electrical motor control circuit to output torque.

7. The energy conversion device according to claim 6, wherein the controller is configured to: when operating in a fourth control mode, control the first electrical motor control circuit to charge and discharge the first energy storage module and the battery pack to heat the battery pack; and/or control the second electrical motor control circuit to charge and discharge the second energy storage module and the battery pack to heat the battery pack.

8. The energy conversion device according to claim 6, further comprising:
a second switch module, connected between the second electrical motor control circuit and the second energy storage module, wherein
the second electrical motor control circuit comprises a second motor inverter, a second motor winding, and a second bus capacitor; a first confluent end of the second motor inverter is connected with the positive electrode of the battery pack and a first end of the second bus capacitor; a second confluent end of the second motor inverter is connected with the negative electrode of the battery pack and a second end of the second bus capacitor; a first end of the second motor winding is connected with the second motor inverter; the second energy storage module and the second switch module are connected between a second end of the second motor winding and the second confluent end; and the second energy storage module and the second switch module are connected in series.

9. The energy conversion device according to claim 8, wherein when the controller is configured to: when operating in the second control mode, turn on the first switch module and turn off the second switch module, wherein the first battery pack heating circuit is formed by the battery pack, the first motor inverter, the first motor winding, the first switch module, and the first energy storage module, and the second electrical motor control circuit is formed by the battery pack, the second bus capacitor, the second motor inverter, and the second motor winding; or
turn off the first switch module and turn on the second switch module, the second battery pack heating circuit is formed by the battery pack, the second motor inverter, the second motor winding, the second switch module, and the second energy storage module, and the first electrical motor control circuit is formed by the battery pack, the first bus capacitor, the first motor inverter, and the first motor winding;
when the controller is configured to: when operating in a third control mode, turn off the first switch module and turn on the second switch module, wherein the first electrical motor control circuit is formed by the battery pack, the first bus capacitor, the first motor inverter, and the first motor winding, and/or
the second electrical motor control circuit is formed by the battery pack, the second bus capacitor, the second motor inverter, and the second motor winding; and
when the controller is configured to: when operating in a fourth control mode, turn on the first switch module and turn off the second switch module, wherein the first battery pack heating circuit is formed by the battery pack, the first motor inverter, the first motor winding, the first switch module, and the first energy storage module; or
turn off the first switch module and turn on the second switch module, the second battery pack heating circuit is formed by the battery pack, the second motor inverter, the second motor winding, the second switch module, and the second energy storage module; or
turn on the first switch module and turn on the second switch module, the first battery pack heating circuit is formed by the battery pack, the first motor inverter, the first motor winding, the first switch module, and the first energy storage module, and the second battery pack heating circuit is formed by the battery pack, the second motor inverter, the second motor winding, the second switch module, and the second energy storage module.

10. The energy conversion device according to claim 9, wherein when the first battery pack heating circuit operates, a first discharging and energy storage circuit is formed by the battery pack, the first motor inverter, the first motor winding, the first switch module, and the first energy storage module; a first discharging and energy release circuit is formed by the first motor inverter, the first motor winding, the first switch module, and the first energy storage module; a first charging and energy storage circuit is formed by the first energy storage module, the first switch module, the first motor winding, and the first motor inverter; and a first charging and energy release circuit is formed by the first energy storage module, the first switch module, the first motor winding, the first motor inverter, and the battery pack;

when the second battery pack heating circuit operates, a second discharging and energy storage circuit is formed by the battery pack, the second motor inverter, the second motor winding, the second switch module, and the second energy storage module; a second discharging and energy release circuit is formed by the second motor inverter, the second motor winding, the second switch module, and the second energy storage module; a second charging and energy storage circuit is formed by the second energy storage module, the second switch module, the second motor winding, and the second motor inverter; and a second charging and energy release circuit is formed by the second energy storage module, the second switch module, the second motor winding, the second motor inverter, and the battery pack.

11. The energy conversion device according to claim 9, wherein before the controller operates in the second control mode, the controller is further configured to:

receive a drive instruction when operating in the fourth control mode;

acquire a temperature of the battery pack when the first battery pack heating circuit is in an operating state and the second electrical motor control circuit is in an idle state; control the second battery pack heating circuit to enter the operating state when it is detected that the temperature of the battery pack does not satisfy a driving condition; control the second electrical motor control circuit to enter the operating state and output torque to enter the second control mode when the temperature of the battery pack satisfies the driving condition; and control the second electrical motor control circuit to output torque to enter the second control mode when it is detected that the temperature of the battery pack satisfies the driving condition; and acquire the temperature of the battery pack when the first battery pack heating circuit and the second battery pack heating circuit are both in the operating state; control the first battery pack heating circuit and the second battery pack heating circuit to heat the battery pack when it is detected that the temperature of the battery pack does not satisfy the driving condition; control the second electrical motor control circuit to output torque or control the first electrical motor control circuit to output torque to enter the second control mode when the temperature of the battery pack satisfies the driving condition; and control the second electrical motor control circuit to output torque or control the first electrical motor control circuit to output torque to enter the second control mode when it is detected that the temperature of the battery pack satisfies the driving condition.

12. The energy conversion device according to claim 8, wherein before the controller operates in the second control mode, the controller is further configured to:

receive a heating instruction when operating in a third control mode;

control the second battery pack heating circuit to be in an operating state to enter the second control mode when the first electrical motor control circuit outputs torque and the second electrical motor control circuit is in an idle state; and control the second battery pack heating circuit to be in an operating state to enter the second control mode when the first electrical motor control circuit and the second electrical motor control circuit output torque.

13. The energy conversion device according to claim 3, wherein the controller is configured to: acquire a drive instruction; and acquire a quantity of ready-to-use motor driving circuits according to the drive instruction; and control a corresponding motor driving circuit to operate according to the quantity of motor driving circuits, to enter the third control mode.

14. The energy conversion device according to claim 8, wherein the controller is configured to: acquire a temperature of the battery pack and compare the temperature of the battery pack with a preset temperature value when a vehicle is in a parking state;

acquire a quantity of ready-to-use charging and discharging circuits according to a comparison result, and control a corresponding charging and discharging circuit to operate according to the quantity of charging and discharging circuits, to enter a fourth control mode.

15. The energy conversion device according to claim 14, wherein the first motor inverter or the second motor inverter comprises N bridge arms; first ends of all of the N bridge arms are connected together to form a first confluent end; second ends of all of the N bridge arms are connected together to form a second confluent end; the battery pack is connected between the first confluent end and the second confluent end;

the first motor winding or the second motor winding comprises N phase windings; the N phase windings are correspondingly connected with midpoints of all the N bridge arms; a neutral point of the N phase windings is connected with a first end of the first energy storage module or a first end of the second energy storage module; a second end of the first energy storage module or a second end of the second energy storage module is connected with the second confluent end;

the controller controls each bridge arm of the N bridge arms to operate cyclically in sequence, to cause the charging and discharging circuit to operate; or the N bridge arms comprise CN pairs of bridge arms; every two bridge arms form one pair of bridge arms; and the controller controls each pair of bridge arms of the CN pairs of bridge arms to operate cyclically in sequence, to cause the charging and discharging circuit to operate.

16. The energy conversion device according to claim 14, wherein the first electrical motor control circuit is formed by multiplexing a compressor of the vehicle.

17. A vehicle, comprising the energy conversion device according to claim 1.

18. An energy conversion device, comprising:

a first electrical motor control circuit connected with a battery pack, wherein the first electrical motor control circuit comprises a first motor inverter, a first motor winding and a first bus capacitor; a first confluent end of the first motor inverter is connected with a positive electrode of the battery pack and a first end of the first bus capacitor; a second confluent end of the first motor inverter is connected with a negative electrode of the battery pack and a second end of the first bus capacitor; a first end of the first motor winding is connected with the first motor inverter;

a second electrical motor control circuit connected with the first electrical motor control circuit in parallel, wherein the second electrical motor control circuit comprises a second motor inverter, a second motor winding, and a second bus capacitor; a first confluent end of the second motor inverter is connected with the positive electrode of the battery pack and a first end of the second bus capacitor; a second confluent end of the second motor inverter is connected with the negative electrode of the battery pack and a second end of the second bus capacitor; a first end of the second motor winding is connected with the second motor inverter;

a controller coupled with the first electrical motor control circuit and second electrical motor control circuit, and configured to: when, operating in a first control mode, control the first electrical motor control circuit to charge and discharge the battery pack to heat the battery pack, and control the second electrical motor control circuit to output torque.

19. The energy conversion device according to claim 18, further comprising:

a first energy storage module, connected with the first electrical motor control circuit to form a first battery pack heating circuit, wherein the controller is configured to: when operating in a second control mode, control the first electrical motor control circuit to charge and discharge the first energy storage module and the battery pack to heat the battery pack, and control the second electrical motor control circuit to output torque.

20. The energy conversion device according to claim 19, further comprising:

a first switch module, connected between the first electrical motor control circuit and the first energy storage module, wherein the controller is configured to: when operating in the second control mode, control the first switch module to be turned on, control the first electrical motor control circuit to charge and discharge the first energy storage module and the battery pack to heat the battery pack, and control the second electrical motor control circuit to output torque.

\* \* \* \* \*

UNITED STATES PATENT AND TRADEMARK OFFICE
CERTIFICATE OF CORRECTION

Page 1 of 1

PATENT NO. : 12,132,432 B2
APPLICATION NO. : 18/074233
DATED : October 29, 2024
INVENTOR(S) : Heping Ling et al.

It is certified that error appears in the above-identified patent and that said Letters Patent is hereby corrected as shown below:

In the Specification

In Column 16, Line 53, that reads "The N bridge arms include CN pairs" should read – The N bridge arms include $C_N^2$ pairs –

In Column 16, Line 55, that reads "controller controls each pair of bridge arms of the CN pairs" should read – controller controls each pair of bridge arms of the $C_N^2$ pairs –

In the Claims

In Column 24, Claim 15, Line 41, that reads "the N bridge arms comprise CN pairs" should read – the N bridge arms $C_N^2$ pairs –

In Column 24, Claim 15, Line 44, that reads "the CN pairs of bridge arms" should read – the $C_N^2$ pairs of bridge arms –

Signed and Sealed this
Sixth Day of May, 2025

Coke Morgan Stewart
*Acting Director of the United States Patent and Trademark Office*